United States Patent [19]

Gellert

[11] Patent Number: 5,046,942
[45] Date of Patent: Sep. 10, 1991

[54] INJECTION MOLDING NOZZLE HAVING TAPERED HEATING ELEMENT ADJACENT THE BORE

[76] Inventor: Jobst U. Gellert, 7A Prince Street, Georgetown, Ontario, Canada, L7G 2X1

[21] Appl. No.: 635,989

[22] Filed: Dec. 31, 1990

[30] Foreign Application Priority Data

Nov. 19, 1990 [CA] Canada .................................. 2030286

[51] Int. Cl.⁵ .............................................. B29C 45/22
[52] U.S. Cl. .................................... 425/549; 219/523; 264/328.15; 425/568; 425/570
[58] Field of Search ........................ 425/549, 568, 570; 264/328.15; 392/480; 219/421, 523

[56] References Cited

U.S. PATENT DOCUMENTS

| 4,688,622 | 8/1987 | Gellert | 164/61 |
| 4,768,283 | 9/1988 | Gellert | 425/549 |
| 4,768,945 | 9/1988 | Schmidt et al. | 425/549 |
| 4,875,848 | 10/1987 | Gellert | 425/549 |
| 4,911,636 | 3/1990 | Gellert | 425/549 |
| 4,941,249 | 7/1990 | Gellert | 425/549 |
| 4,954,072 | 9/1990 | Zimmerman | 425/549 |

Primary Examiner—Timothy Heitbrink
Attorney, Agent, or Firm—Dalesman & Company

[57] ABSTRACT

An injection molding thermal gated nozzle having a nose portion which extends forwardly to the cavity. The nozzle has a melt channel which extends through the nose portion to form the gate. An integral electric heating element has a forward portion with a generally rectangular cross section and a number of adjacent coils which form an inwardly tapered inner surface. Part of the inner surface of the forward portion of the heating element forms an inwardly tapered portion of the melt channel adjacent the gate. This direct contact of the heating element with the melt reduces considerably the cycle time of the thermal gate. The forward portion of the heating element is shaped by compressing it between tapered dies. It is then mounted between forward and rearward portions of the nozzle, and the assembly is integrally brazed together in a vacuum furnace.

1 Claim, 3 Drawing Sheets

INJECTION MOLDING NOZZLE HAVING TAPERED HEATING ELEMENT ADJACENT THE BORE

BACKGROUND OF THE INVENTION

This invention relates generally to injection molding, and more particularly to a thermal gated injection molding nozzle having an integral heating element with an inwardly tapered forward portion which defines a tapered part of the melt channel adjacent the gate.

Thermal gating which is also referred to as temperature assisted gating involves changing the temperature of the melt in the gate area during each cycle to assist in controlling flow to the cavity. This is known in the art such as in U.S. Pat. No. 4,768,945 to Schmidt et al. which issued Sept. 6, 1988 which describes the heating element having a forward portion extending diagonally into a nose portion of the nozzle. In the applicant's U.S. Pat. No. 4,911,636 which issued Mar. 27, 1990 and U.S. Pat. No. 4,941,249 which issued July 17, 1990, thermal gating is described using a nozzle with an integral heating element having a circular portion which encircles the melt bore in a forward nose portion of the nozzle. The applicant's U.S. Pat. No. 4,875,848 which issued Oct. 24, 1989 discloses a tapered gate insert seated in the forward end of a nozzle which is heated by an integral helical heating element.

In all of these previous arrangements, the heating element is embedded in the steel nozzle or gate insert and is not in direct contact with the melt flowing through the melt channel. Thus, when using these previous systems for thermal gating, it has been found that there is a limit on the minimum cycle time because the heating element is embedded in the steel body of the nozzle which acts as a heat sink.

SUMMARY OF THE INVENTION

Accordingly, it is an object of the present invention to at least partially overcome the disadvantages of the prior art by providing a thermal gated injection molding nozzle in which a portion of the heating element is in direct contact with the melt adjacent the gate.

To this end, in one of its aspects, the invention provides an elongated injection molding nozzle with a rear end and a forward end, formed by a forwardly extending central nose portion, the nozzle having a melt channel extending through the nose portion of the nozzle to form a gate adjacent the forward end, the nozzle having an integral electrically insulated heating element, the heating element having a rear portion extending to a terminal and a central portion extending helically around the melt channel, the improvement wherein the heating element has a forward portion with a generally uniform rectangular cross section, the forward portion of the heating element having a plurality of adjacent coils which form a forwardly inwardly tapered inner surface, the forward portion of the heating element being integrally mounted in the nozzle whereby at least part of the inner surface forms an inwardly tapered portion of the melt channel adjacent the gate.

Further objects and advantages of the invention will appear from the following description taken together with the accompanying drawings.

DETAILED DESCRIPTION OF THE DRAWINGS

Figure 1:
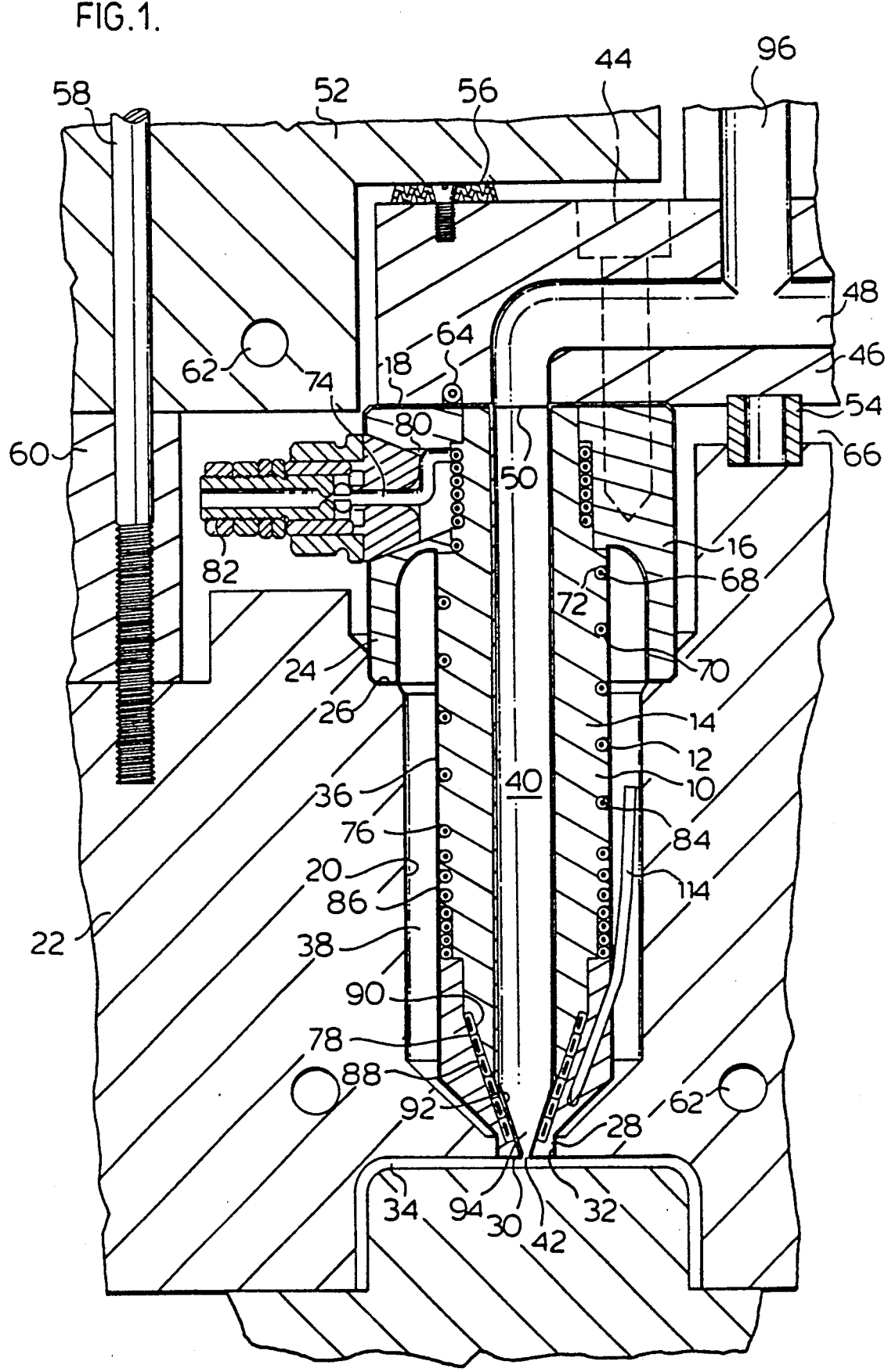
FIG. 1 is a sectional view of a portion of a multi-cavity injection molding system or apparatus showing a thermal gated nozzle according to a preferred embodiment of the invention.

Reference is first made to FIG. 1 which shows a portion of a thermal gated injection molding system having a number of integral elongated nozzles 10 with an integral electrically insulated heating element 12. Each nozzle 10 has a steel main body 14 extending from a steel collar 16 adjacent the rear end 18. The nozzle 10 is seated in a well 20 in the cavity plate 22 by a circumferential insulation flange 24 which extends from the collar 16 and sits on a circumferential shoulder 26. The nozzle 10 has a nose portion 28 adjacent the forward end 30 which is received in an opening 32 through the cavity plate 22 leading to a cavity 34. Thus, the nozzle 10 is accurately located in this position in which the cylindrical outer surface 36 of the main body 14 is separated from the surrounding cavity plate 22 by an insulative air space 38. In this embodiment, the nozzle 10 has a central melt channel 40 which extends to a gate 42 in the nose portion 28 leading to the cavity 34.

The nozzles 10 are secured by bolts 44 to a common elongated manifold 46 which has a melt passage 48 which branches to a number of outlets 50, each of which is aligned with the melt channel 40 through one of the nozzle 10. The manifold 46 is located securely in place between a back plate 52 and the cavity plate 22 by a central locating ring 54 and a resilient spacer member 56. The back plate 52 is held in place by bolts 58 which extend through a support plate 60 into the cavity plate 22. The back plate 52 and the cavity plate 22 are cooled by pumping cooling water through cooling conduits 62. The manifold 46 is heated by an electric heating element 64 which is cast into it as described in the applicant's U.S. Pat. No. 4,688,622 which issued Aug. 25, 1987. The locating ring 54 provides another insulative air space 66 between the heated manifold 46 and the cavity plate 22.

In this embodiment, the heating element 12 has a nickel chrome resistance wire 68 extending through a refractory powder electrical insulating material 70 such as magnesium oxide inside a steel casing 72. The heating element 12 has a rear portion 74, a helical central portion 76, and a forward portion 78. The rear portion 74 extends outwardly through an opening 80 in the collar 16 to a cold terminal 82 to receive a connection from an external lead wire (not shown). The central portion 76 of the heating element 12 is integrally brazed in a spiral channel 84 in the outer surface 36 of the main body 14 to extend around the melt channel 40. The helical portion of the heating element 76 in the channel 84 is covered by a protective nickel coating 86 which is applied as described in the applicant's U.S. Pat. No. 4,768,283 which issued Sept. 6, 1988.

While the rear and central portions 74,76 of the heating element 12 have a generally uniform circular cross section, the forward portion 78 has a generally uniform rectangular cross section. The forward portion 78 is wound in a number of adjacent coils 88 which form an inner surface 90 which is tapered forwardly inwardly. As can be seen, a part 92 of the inner surface 90 of the coils 88 forms an inwardly tapered portion 94 of the melt channel 40 adjacent the gate 42.

In use, the system is assembled as shown in FIG. 1 and electrical power is applied to the heating element 12 of each nozzle 10 and the heating element 64 in the manifold 46 to heat them to a predetermined operating temperature depending on the material being molded. Pressurized melt from a molding machine (not shown) is injected into the melt passage 48 in the manifold 46 through the inlet 96 according to a cycle which is controlled in conjunction with a cycle of applying power to the heating elements 12 in the nozzles 10. Thus, thermal or temperature assisted gating is provided by switching off the power to the heating elements 12 for a short period of time before and when the mold is opened to eject the molded products. Heat loss from the nose portion 28 to the surrounding cooled cavity plate 22 results in the gates 42 freezing off prior to ejection. As the mold is closed, power is reapplied to the heating elements 12 to heat the solidified melt in the gates 42 so they reopen immediately when injection pressure is reapplied. The pressurized melt flows through the melt channel 40 and gate 42 in each nozzle 10 and fills the cavities 34. After the cavities are filled, injection pressure is held momentarily to pack and then released. After a short cooling period, the mold is opened to eject the molded products. This cycle is repeated continuously as rapidly as possible, which in some instances is several times per minute. It will be appreciated that the location of the forward portions 78 of the heating elements 12 in direct contact with the melt in the melt channels 40 adjacent the gates 42 substantially reduces the time required after the power is switched back on to unfreeze the solidified melt in the gates 42, and thus reduces cycle time. Furthermore, the tapered coils 88 of the forward portions 78 of the heating elements 12 gradually extend rearwardly further into the main body 14 of the nozzles so that the temperature impact of the thermal gating is gradually reduced away from the gates 42. The central portions 76 of the heating elements 12 are embedded in the steel main bodies 14 of the nozzles 12 at a considerable distance from the central melt channels 40. Thus, the main bodies act as heat sinks and temperature fluctuations of the melt in this area due to the thermal gating cycle are minimized.

Figure 2:
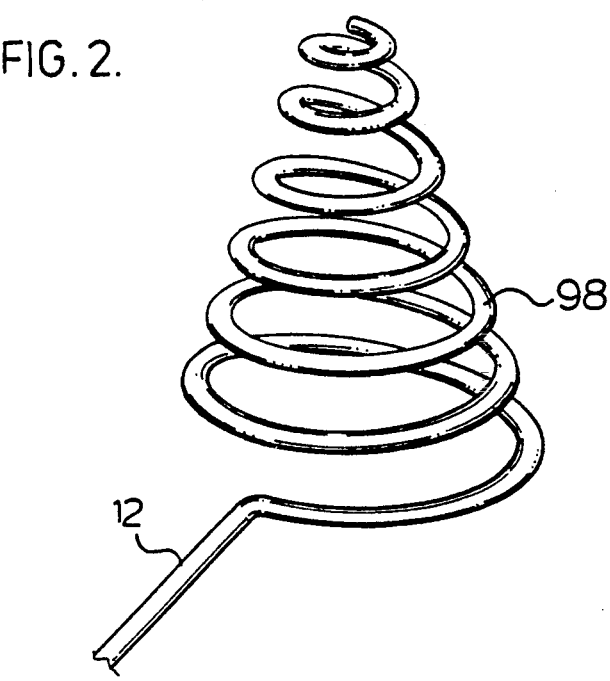
FIG. 2 is an isometric view showing how an electrical heating element is wound to form a tapered coiled portion.
Figure 3:
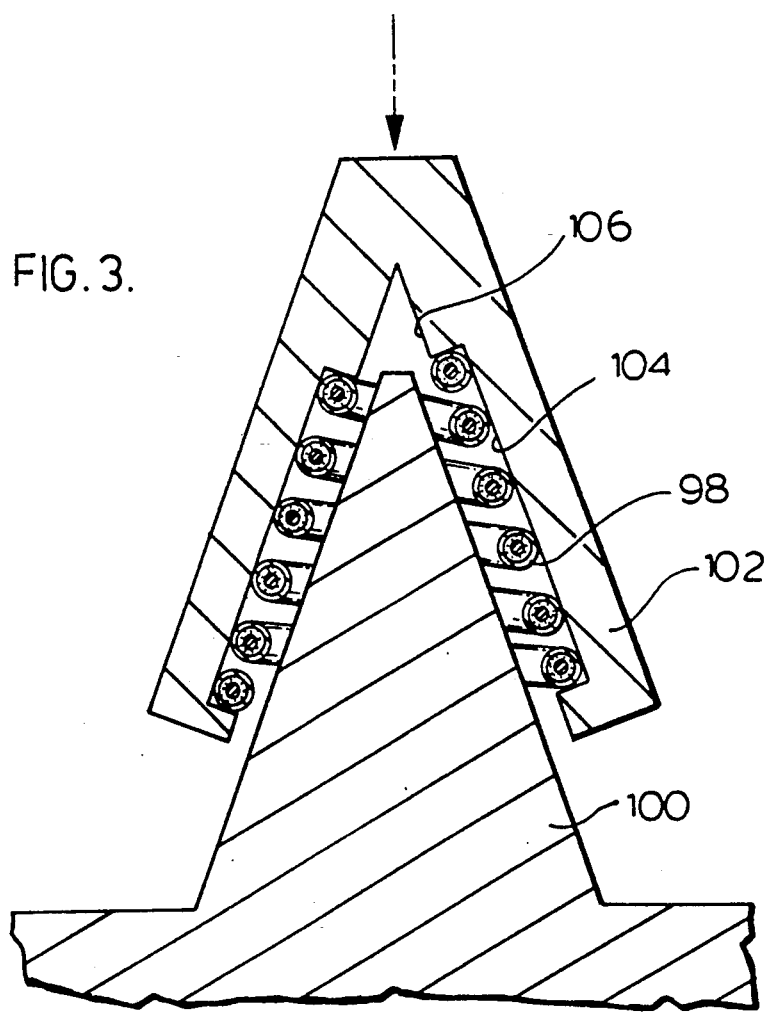
FIG. 3 is a schematic sectional view showing how the coiled portion of the heating element is compressed in a die to shape the coil as well as the cross section of that portion of the heating element.
Figure 4:
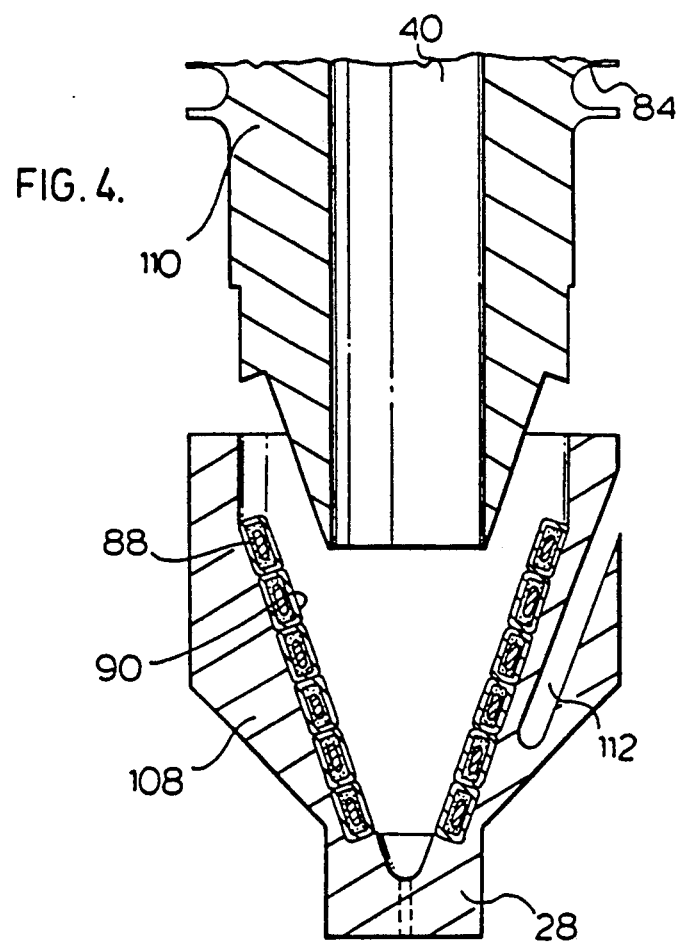
FIG. 4 is a sectional view of two portions of the nozzle showing how the heating element is mounted between them.

Reference will now be made to FIGS. 2-4 to describe the steps involved in making the nozzle. First, a predetermined length of a heating element 12 is wound on a conical jig (not shown) to form a tapered coiled portion 98 as seen in FIG. 2. This coiled portion 98 of the heating element 12 is then compressed between inner and outer tapered dies 100,102 as shown in FIG. 3. The outer die 102 has a predetermined sized opening 104 around its inner surface 106 into which the coiled portion 98 of the heating element is inserted When the outer die 102 is forced down against the inner die 100 as shown by the arrow, the coiled portion 98 of the heating element 12 is compressed to form the forward portion 78 having the shape shown in FIGS. 1, 4 and 5. As can be seen, the generally round cross section has become generally rectangular, and the adjacent coils 88 form the tapered inner surface 90.

Figure 5:
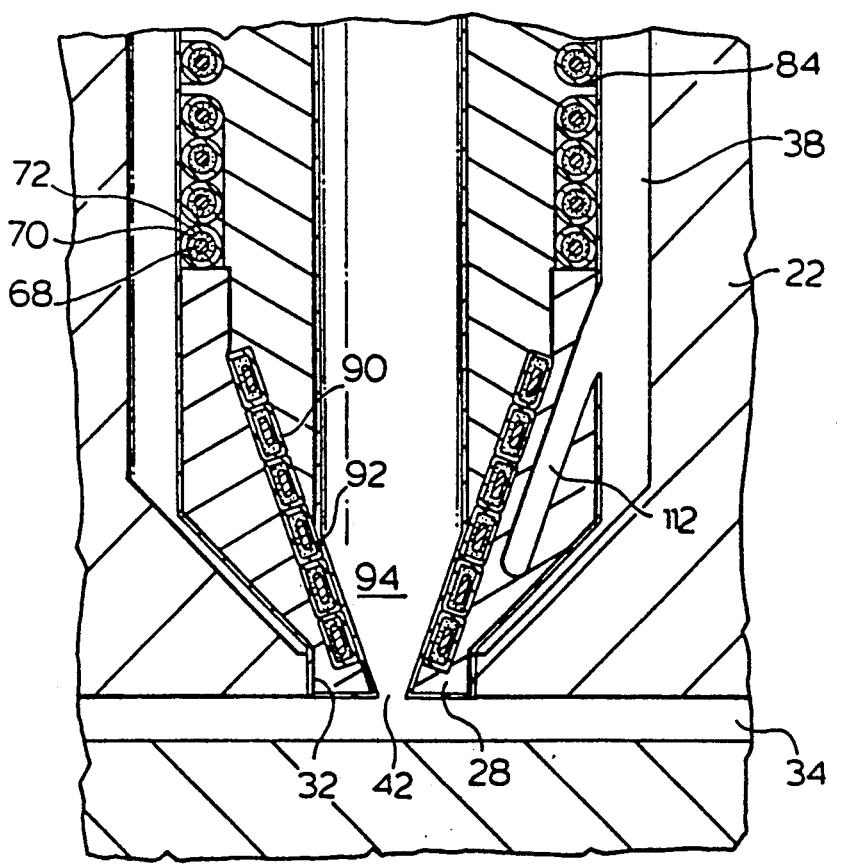
FIG. 5 is a sectional view of the same completed portions of the nozzle.

The forward portion 78 is then mounted between forward and rearward portions 108,110 of the main body 14, as seen in FIG. 4. After the two portions 108,110 are temporarily secured together, the remainder of the heating element is wound with several adjacent windings initially in the spiral channel 84 in the outer surface 36 and then out through the opening 80 in the collar 16 to the terminal 82. The assembly is then coated with a nickel alloy brazing material and brazed together in a vacuum furnace. As described in detail in the applicant's U.S. Pat. No. 4,768,283 which issued Sept. 6, 1988 this provides a metallurgical bonding of the parts into an integral unit and forms the protective nickel coating 86. As seen in FIG. 5, a thermocouple bore 112 is provided to receive a thermocouple 114 to measure the temperature of the nozzle adjacent the forward portion 78 of the heating element 12. The nose portion 28 is then machined and the melt channel 40 extended through the nose portion by electric discharge machining to form the gate 42 of a selected size to provide the desired gating configuration.

While the description of the nozzle and method of making it have been given with respect to a preferred embodiment, it is not to be construed in a limiting sense. Variations and modifications will readily occur to those skilled in the art. For instance, it is apparent that the sizes of the melt channel and the gate and the angle of tapes of the inner surface will be different for different applications. In some nozzles, the melt channel 40 may extend inwardly from the side of the nozzle 12 rather than from the rear end 18. Different arrangements of dies may be used to comprise the coiled portion 98 of the heating element 12. Reference is made to the appended claims for a definition of the invention.

What is claimed is:

1. In an elongated injection molding nozzle with a rear end and a forward end, formed by a forwardly extending central nose portion, the nozzle having a melt channel extending through the nose portion of the nozzle to form a gate adjacent the forward end, the nozzle having an integral electrically insulated heating element, the heating element having a rear portion extending to a terminal and a central portion extending helically around the melt channel, the improvement wherein;

the heating element has a forward portion with a generally uniform rectangular cross section, the forward portion of the heating element having a plurality of adjacent coils which form a forwardly inwardly tapered inner surface, the forward portion of the heating element being integrally mounted in the nozzle whereby at least part of the inner surface forms an inwardly tapered portion of the melt channel adjacent the gate.

* * * * *